G. W. MITTELSTAEDT.

FLY ESCAPE SCREEN.

APPLICATION FILED JUNE 4, 1920.

Reissued Nov. 16, 1920.

14,987.

Inventor
George W. Mittelstaedt
By Barnes & Truman
Attorneys

UNITED STATES PATENT OFFICE.

GEORGE W. MITTELSTAEDT, OF MORTON GROVE, ILLINOIS, ASSIGNOR TO FLY ESCAPE SCREEN COMPANY, OF CHICAGO, ILLINOIS, A CORPORATION OF ILLINOIS.

FLY-ESCAPE SCREEN.

14,987. Specification of Reissued Letters Patent. Reissued Nov. 16, 1920.

Original No. 1,305,147, dated May 27, 1919, Serial No. 282,281, filed March 13, 1919. Application for reissue filed June 4, 1920. Serial No. 386,578.

*To all whom it may concern:*

Be it known that I, GEORGE W. MITTELSTAEDT, a citizen of the United States, residing at Morton Grove, in the county of Cook and State of Illinois, have invented certain new and useful Improvements in Fly-Escape Screens, of which the following is a specification.

This invention relates to fly escape screens, and particularly to that type of screen which permits and induces the escape of flies from the room where the screen is located by taking advantage of the instinct of such insects to walk upwardly on the screen and to be attracted toward the light.

The invention has for its primary object to provide an improved fly escape screen which is simple in construction and may be cheaply and easily manufactured from material usually employed in the construction of the ordinary screen.

A further object is to provide a type of construction adapted to be applied to the ordinary screen by means of which it may be easily reconstructed to form a fly escape screen.

The invention consists in the novel constructions, arrangements and combinations hereinafter described and claimed, for carrying out the above objects, and such other objects as will appear from the following description of a preferred embodiment of the invention.

In the drawing I have illustrated a preferred form of construction embodying the principles of my invention and in which—

Like characters of reference designate like parts in the several figures of the drawings.

Figure 1:
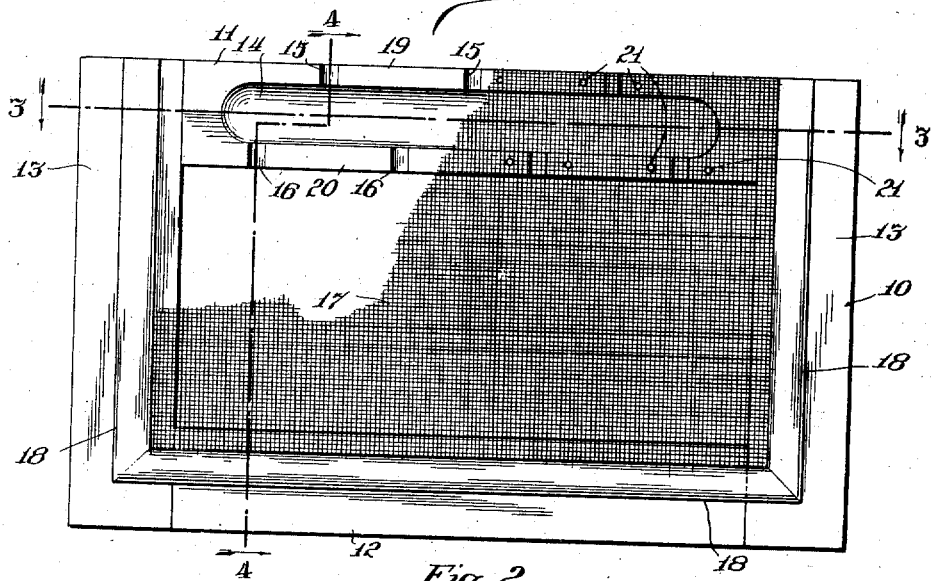
Figure 1 is an elevation of the exterior of a screen, a portion of the screen mesh thereof having been broken away.
Figure 2:
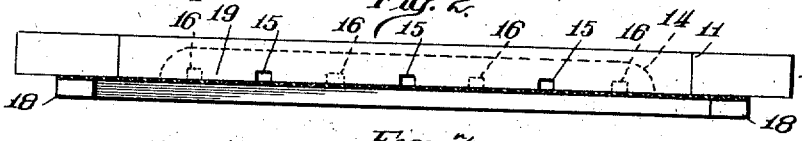
Fig. 2 is a top plan view of the screen shown in Fig. 1.
Figure 3:
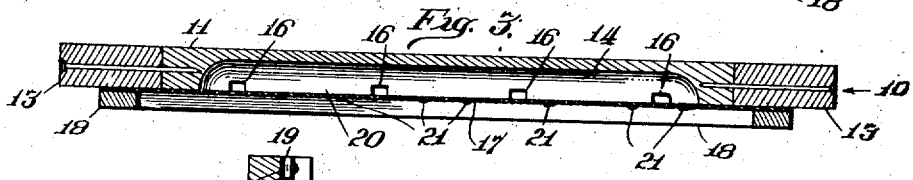
Fig. 3 is a horizontal section taken along the line 3—3 of Fig. 1.
Figure 4:
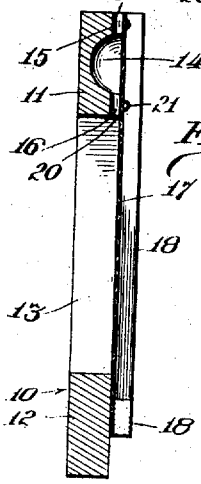
Fig. 4 is a vertical section taken along the line 4—4 of Fig. 1.

For the purpose of illustration I have shown the invention applied to a conventional form of half screen. A half screen is one which covers only half of the window instead of the entire opening, and is customarily positioned opposite the lower window sash. The frame 10 is shown as formed of upper and lower rails 11 and 12 and side stiles 13 of solid material, such as wood, for example, although the principles of my invention are applicable equally to the metal frame construction in which the frame members are of any suitable metal construction. Preferably the frame members 11, 12 and 13 are in all respects similar to the frame members used in any ordinary screen construction, with the exceptions hereinafter noted. They are fastened together in the form of a frame in any approved manner.

The upper rail 11 is formed with a cavity 14 in the shape of a longitudinal channel formed in the exterior face of the rail intermediate the adjacent edges. If the frame is of wood construction, the channel 14 may be readily cut therein by any ordinary rabbeting tool or machine. If the construction is of metal, the channel is preferably pressed, or otherwise formed in the rail. Fly escape passages 15 and 16 lead from the cavity 14 to the upper and lower edges, respectively, of the rail 11. These passages or openings are of a size to permit the escape of a fly. Preferably the openings or passages 15 and 16 are not placed opposite each other, so as to decrease the probability that flies will find their way into the room from the exterior. Any suitable screening material 17 is secured to the exterior of the frame, and extends over both the cavity 14 and the passages 15 and 16. The side and lower margins of the screening material are secured by suitable fastening elements and preferably covered by finishing strips 18. Preferably the screen is secured to the upper and lower margins 19 and 20 of the rail 11 only by fastening elements 21, such as small nails, placed on opposite sides of the passages 15 and 16 which hold the screening material firmly in position. Preferably no finishing strip is used on the upper rail, so as not to cast a shadow across the fly escape passages.

Flies will not pass through a shaded passage or across a shaded line. It is desirable, therefore, that the cavity 14 and the fly escape passages open to the light and be free from shadows.

The ordinary window screen may be reconstructed to form a fly escape screen by cutting a channel in the top rail and by providing fly escape passages leading thereto, and by covering the exterior face of the top rail by screening material, as pointed out above.

The cavity 14, being relatively large, admits light above the lower set of openings 16. This light causes the flies to travel through the passages 16 into the relatively large cavity 14 and upward through the passages 15 because of the attraction of the light passing from above through the passages 15. In view of the fact that flies do not crawl downwardly, and the fact that the passages may also be staggered so that no light will pass from below to the passages 15, it is not probable that flies will find their way to the interior of the room by passing down through the passages 15.

The simplicity of the construction of my fly escape screen enables the same to be made from the same material of which the ordinary screen is made, and at a very slight increase in cost over that of the ordinary screen. No additional or specially constructed material is necessary. The additional operations in constructing the upper rail are inexpensive and require no special machinery.

I claim:

1. A fly escape screen comprising a framework including a top rail formed with a cavity therein opening on the exterior and formed intermediate the upper and lower edges thereof, said top rail being also provided with two series of openings made above and below said cavity in the upper and lower parts of said top rail, said openings being made through the outside face of the screen, and a suitable mesh material secured to said frame and to the exterior face of said top rail, the mesh material inclosing on the exterior said cavity and openings, substantially as described.

2. A fly escape screen of the character described, including a frame having a top rail provided with an elongated cavity opening out on the exterior face of said rail and made intermediate the upper and lower parts of the rail, said cavity providing a trap or prison for insects, said top rail also having a series of fly exit openings in the lower part thereof placing the cavity in communication with the room, said openings being made through the exterior face of the top rail, said top rail being also provided with a second series of fly exit openings made in the upper part of said top rail and arranged in staggered relation to the openings of said first-named series, the last named openings placing the trap or prison in communication with the outdoors and being made through the exterior face of said top rail, and a mesh material secured to said framework and to the exterior face of said top rail whereby to close the cavity and both of said series of openings, substantially as described.

3. A fly escape screen comprising vertical side stiles, horizontal top and bottom rails connecting said vertical stiles, said top rail being formed with a substantially semi-cylindrical cavity therein opening on the outside face and with numerous small openings arranged in staggered relation in the upper and lower parts of said top rail, said openings being made through the exterior face of the top rail and leading, respectively, to the room and to the outdoors, a mesh material stretched over and secured to said frame-work, vertical strips concealing the side edges of said mesh material and secured to said vertical stiles, a lower strip concealing the bottom edge of said mesh material and secured to the lower rail, the top of the mesh material being left free of strips, and fastening means for securing the mesh material directly to said top rail, said fastening means being arranged in pairs close to and at opposite sides of said openings, substantially as described.

4. A fly escape screen comprising a frame having the top rail thereof formed with a cavity therein intermediate the adjacent edges, and having fly escape passages leading from said cavity to said adjacent edges.

5. In a fly escape screen comprising a frame covered on its outer face with mesh screen, a top rail having a cavity in its outer face covered with said screen and relatively short fly escape passages leading from said cavity to the upper and lower edges of said top rail.

6. In a fly escape screen, an integral top rail having formed therein a cavity opening on its outer face, and fly escape passages leading from said cavity to the upper and lower edges of said top rail.

7. In a fly escape screen, the combination with the side members of a frame, of a top rail having a longitudinal cavity therein opening to the exterior, a mesh screen secured to the exterior of said frame and covering said cavity, said top rail being also formed with fly escape openings leading to and from said cavity.

8. A fly escape screen comprising a rectangular frame covered on the exterior with screening material, the top rail of which is integral and formed with a longitudinal channel intermediate the edges of said top rail and with fly escape passages leading from the channel to the adjacent edges of said rail, said channel and passages being cut in the exterior face of said rail and being covered by said screening material.

9. A fly escape screen comprising a frame provided with a rail having formed in the outer exposed face thereof a cavity, and fly escape passages leading from the interior of said screen to said cavity and from said cavity to the upper edge of said rail, said frame having screening material therein extending over the exposed face of said rail to cover said cavity and passages.

GEORGE W. MITTELSTAEDT